No. 717,975. PATENTED JAN. 6, 1903.
J. M. DODGE.
CHAIN LINK.
APPLICATION FILED OCT. 26, 1901.

NO MODEL.

Witnesses:-
Frank L. A. Graham
Herman E. Metius

Inventor:-
James M. Dodge,
by his Attorneys;
Howson & Howson

UNITED STATES PATENT OFFICE.

JAMES M. DODGE, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

CHAIN-LINK.

SPECIFICATION forming part of Letters Patent No. 717,975, dated January 6, 1903.

Application filed October 26, 1901. Serial No. 80,118. (No model.)

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in the manufacture of chain-links in which the side members are connected together by a tubular cross member. It has been the common practice in manufacturing links of this type to braze the side links to the cross-link or rivet them in place. Both these forms of attachment are objectionable, as the side members of the links are apt to become detached from the cross member, owing to the strain to which the links are subjected.

Figure 1:
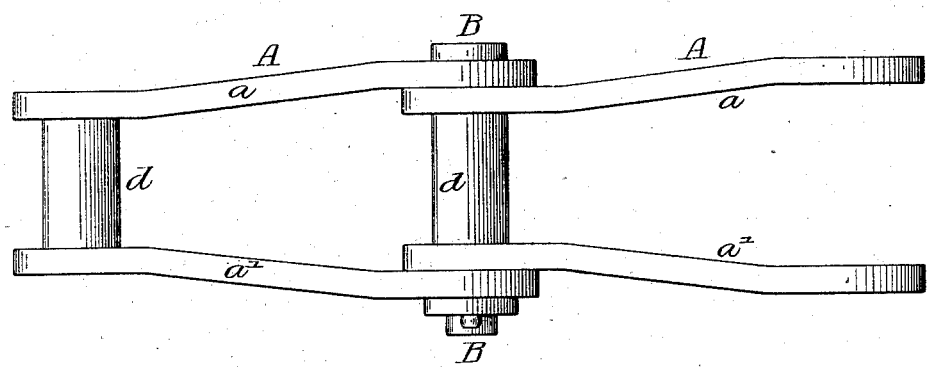
Figure 2:
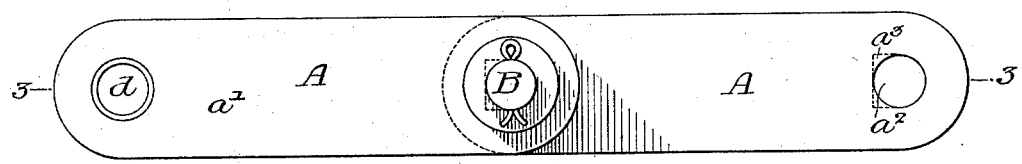
Figure 3:
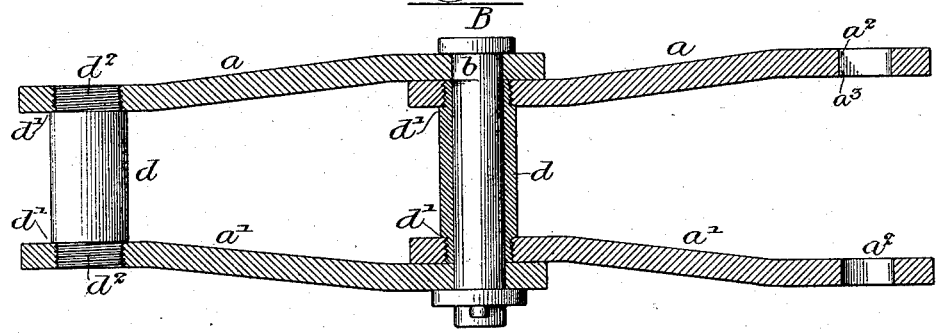

In the accompanying drawings, Figure 1 is a plan view showing two of my improved chain-links coupled together. Fig. 2 is a side view of Fig. 1; and Fig. 3 is a longitudinal sectional view on the line 3 3, Fig. 2.

A A are two links coupled together by a pin B. Each link consists of two side members $a\ a'$ and a tubular cross member $d$ at one end, through which passes the pin B. The opposite ends of the side members are bent outward, so as to allow the narrow end of an adjoining link to be coupled thereto. The opening in one end of each side member is screw-threaded, and both openings have either a right or left hand thread, and the cross member $d$ is reduced at each end $d^2$, so as to provide a shoulder $d'$ at each end, and a right or left hand thread is cut on the reduced portion $d^2$. The side members are screwed onto the reduced portions of the cross member $d$ until they come up to the shoulders $d'$. The links are then in position to be coupled together.

The side members $a\ a'$ are perforated at $a^2$ for the passage of the pin B. The pin passes through the side members and through the tubular cross-bar $d$, as indicated, and a split pin or nut is provided to prevent the withdrawal of the pin B. Directly under the head of the pin B is a squared portion $b$, fitting the squared portion $a^3$ of the link, as shown by dotted lines in Fig. 2, so as to prevent the pin turning. The cross member $d$ turns on the pin. After the side members are screwed onto the cross member the joints may be brazed, although this is not necessary, as after the links are coupled it will be impossible for the cross member to turn in the side members, as the turning in one direction will bring one side member up against the shoulder on one side or turning in the opposite direction will bring the other cross member in contact with the shoulder on the other side.

I claim as my invention—

The combination in a chain-link having two side members, a cross member, said cross member having a reduced portion forming shoulders at each end, the reduced portions having screw-threads cut in the same direction and the side members having threaded openings into which the threaded portion of the cross member is screwed, substantially as described.

In testimony whereof I have signed my name to this specification in the presence of two subscribing witnesses.

JAMES M. DODGE.

Witnesses:
WILL. A. BARR,
JOS. H. KLEIN.